(12) United States Patent
Ohara

(10) Patent No.: US 8,177,259 B2
(45) Date of Patent: May 15, 2012

(54) CANISTER MOUNTING STRUCTURE

(75) Inventor: Minao Ohara, Hamamatsu (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 37 days.

(21) Appl. No.: 12/460,282

(22) Filed: Jul. 16, 2009

(65) Prior Publication Data
US 2010/0032989 A1 Feb. 11, 2010

(30) Foreign Application Priority Data
Aug. 8, 2008 (JP) ................. 2008-205350

(51) Int. Cl.
*B62D 21/02* (2006.01)

(52) U.S. Cl. ........ 280/834; 280/830; 280/781; 280/785; 123/468; 123/519; 55/385.3

(58) Field of Classification Search ............... 55/385.3; 123/519; 280/830, 834, 781, 785, 433; 296/204
See application file for complete search history.

(56) References Cited

U.S. PATENT DOCUMENTS

| | | | | |
|---|---|---|---|---|
| 4,805,581 A | * | 2/1989 | Yamada et al. | ............... 123/519 |
| 5,195,780 A | * | 3/1993 | Inoue et al. | ................. 280/834 |
| 5,868,428 A | * | 2/1999 | Ishikawa | ..................... 280/834 |
| 6,893,047 B2 | * | 5/2005 | Chou et al. | ................... 280/834 |
| 2001/0047723 A1 | * | 12/2001 | Miura et al. | ..................... 96/121 |
| 2007/0197155 A1 | * | 8/2007 | Park et al. | ..................... 454/142 |

FOREIGN PATENT DOCUMENTS

| | | |
|---|---|---|
| JP | 63-123324 | 8/1988 |
| JP | 4-86524 | 7/1992 |
| JP | 3031742 | 8/1992 |
| JP | 5-58173 | 3/1993 |

* cited by examiner

*Primary Examiner* — Tony H. Winner
*Assistant Examiner* — Jacob Knutson
(74) *Attorney, Agent, or Firm* — Flynn, Thiel, Boutell & Tanis, P.C.

(57) ABSTRACT

A canister that adsorbs evaporated fuel in a fuel tank is protected from an impact force and is mounted sufficiently at a height above the ground to eliminate the need for a protection member. A pair of left and right side members extend in a longitudinal direction of the vehicle on a lower side of a rear floor of the vehicle. The canister is disposed between the fuel tank and the spare tire housing. A pair of front and rear cross members extending in the widthwise direction of the vehicle connect to the side members between the fuel tank and the spare tire housing. The canister is disposed directly below the rear floor between the pair of front and rear cross members, and the canister is mounted to the front and rear cross members.

15 Claims, 3 Drawing Sheets

CANISTER MOUNTING STRUCTURE

FIELD OF THE INVENTION

The present invention relates to a canister mounting structure, and more particularly, to a canister mounting structure capable of protecting a canister which adsorbs evaporated fuel in a fuel tank from an impact force.

BACKGROUND OF THE INVENTION

A canister is mounted in a vehicle to prevent evaporated fuel generated in a fuel tank from being discharged into atmosphere. The canister introduces and adsorbs evaporated fuel generated in the fuel tank, discharges the evaporated fuel into an intake passage during operation of an engine and burns the evaporated fuel.

According to a conventional canister mounting structure disclosed in Japanese Patent Application Laid-Open No. 5-58173, a fuel tank is provided between rear side members. A spare tire house is provided between the rear side members behind the fuel tank. The rear side members are connected through a cross member between the fuel tank and the spare tire house. The canister is attached to a substantially intermediate position of a lower surface of the cross member in a state where the canister is exposed to outside air.

According to another conventional canister mounting structure disclosed in Japanese Utility Model Application Laid-Open No. 4-86524, a vehicle frame includes left and right side members and two cross members. The two cross members support one end of a tank support bracket and a fuel tank is assembled supported on the other end of the tank support bracket. The tank support bracket supports a front side of the fuel tank, and a canister is mounted and supported on the tank support bracket.

According to another conventional canister mounting structure disclosed in Japanese Patent No. 3031742, a recess is formed in a lower portion of a fuel tank. A canister is mounted in the recess by a mounting holder. An insulator is mounted on a lower side of the fuel tank, and the canister is fixed to the insulator through a flange.

According to another conventional canister mounting structure disclosed in Japanese Utility Model Application Laid-Open No. 63-123324, an opening is formed in a lower surface of a cross member which connects left and right side members with each other above a fuel tank. A canister is inserted and mounted into the opening.

In a mounting structure for attaching a canister to a lower side of a rear floor outside an engine room, it is necessary to protect the canister against an impact force applied from behind the vehicle, or applied by a stone during driving to ensure safety.

Conventionally, a bracket is separately provided as a protection member to protect the canister from the impact force of a stone, but there is a problem in that the weight and cost of the structure are increased. Further, there is a problem in that an impact force from behind the vehicle applied to the canister through the bracket which is the protection member, can damage the structure.

According to the mounting structures described in Japanese Patent Application Laid-Open No. 5-58173 and Japanese Patent No. 3031742, since the canister is mounted on the lower surface of the cross member or the lower portion of the fuel tank, it becomes difficult to sufficiently ensure a height of the canister from the ground, and there is an adverse possibility that the canister comes into contact with a stone or a projection of the ground.

According to the mounting structure described in Japanese Utility Model Application Laid-Open No. 4-86524, the fuel tank is assembled and supported by the two cross members through the tank support bracket, and the canister is mounted and supported on the tank support bracket which supports the front side of the fuel tank such that the canister projects forward of the vehicle. Therefore, there is no protection member on the front side of the canister, and there is an adverse possibility that the canister comes into contact with a stone or a projection of the ground.

According to the mounting structure described in Japanese Utility Model Application Laid-Open No. 63-123324, the canister is inserted and mounted into an opening formed in the lower surface of the cross member which connects the side members with each other. Therefore, although the canister can be protected from a stone, there is a problem in that the strength of the cross member is deteriorated because the opening is formed therein.

In a mounting structure of a canister, it is an object of the present invention to protect the canister which adsorbs evaporated fuel in a fuel tank from an impact force from behind a vehicle, and to sufficiently secure the height of the canister from the ground, thereby eliminating the need of a protection member which protects the canister from the impact force or a stone.

SUMMARY OF THE INVENTION

The present invention provides a canister mounting structure in which a spare tire compartment, housing or house projecting downward of a vehicle is formed in a central portion of a rear floor of the vehicle in a widthwise direction of the vehicle. A pair of left and right side members extending in a longitudinal direction of the vehicle are disposed on a lower side of the rear floor. A fuel tank and the spare tire house are disposed between the side members in this order from the front of the vehicle, and a canister which introduces and adsorbs evaporated fuel generated in the fuel tank is disposed between the fuel tank and the spare tire house. A pair of front and rear cross members extending in the widthwise direction of the vehicle are connected to the side members between the fuel tank and the spare tire house. The canister is disposed directly below the rear floor between the pair of front and rear cross members, and the canister is mounted on the pair of front and rear cross members.

According to the canister mounting structure of the invention, when an impact force is applied from behind the vehicle, the canister is protected by means of a cross member having high rigidity. Therefore, it is possible to protect the canister from being damaged, and the canister can be placed at a high location directly below a rear floor. Therefore, it is possible to eliminate the need of a protection member which protects the canister from a stone or a projection on the ground, and to reduce the weight and cost of the structure.

According to the canister mounting structure of the invention, the canister is placed directly below the rear floor between a pair of front and rear cross members, thereby protecting the canister from an impact force, and the need of the protection member is eliminated.

Embodiments of the present invention will be explained based on the drawings.

DETAILED DESCRIPTION OF THE INVENTION

Figure 1:
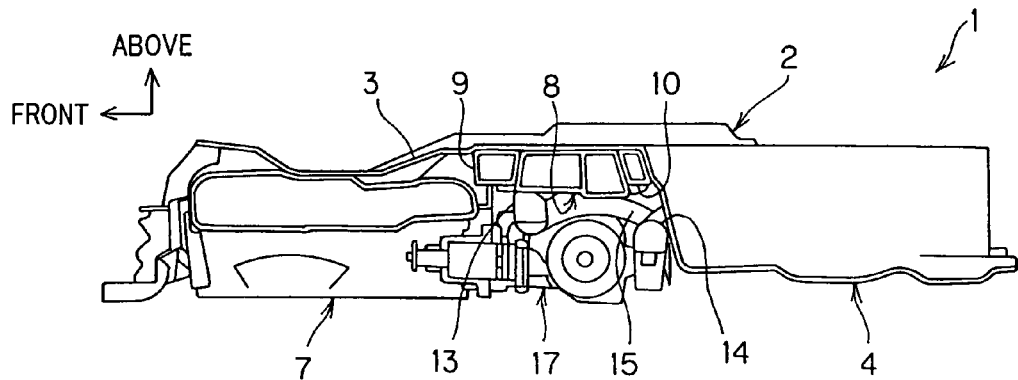
FIG. 1 is a sectional view of a rear floor showing an embodiment of a canister mounting structure taken along a longitudinal direction of a vehicle.
Figure 2:
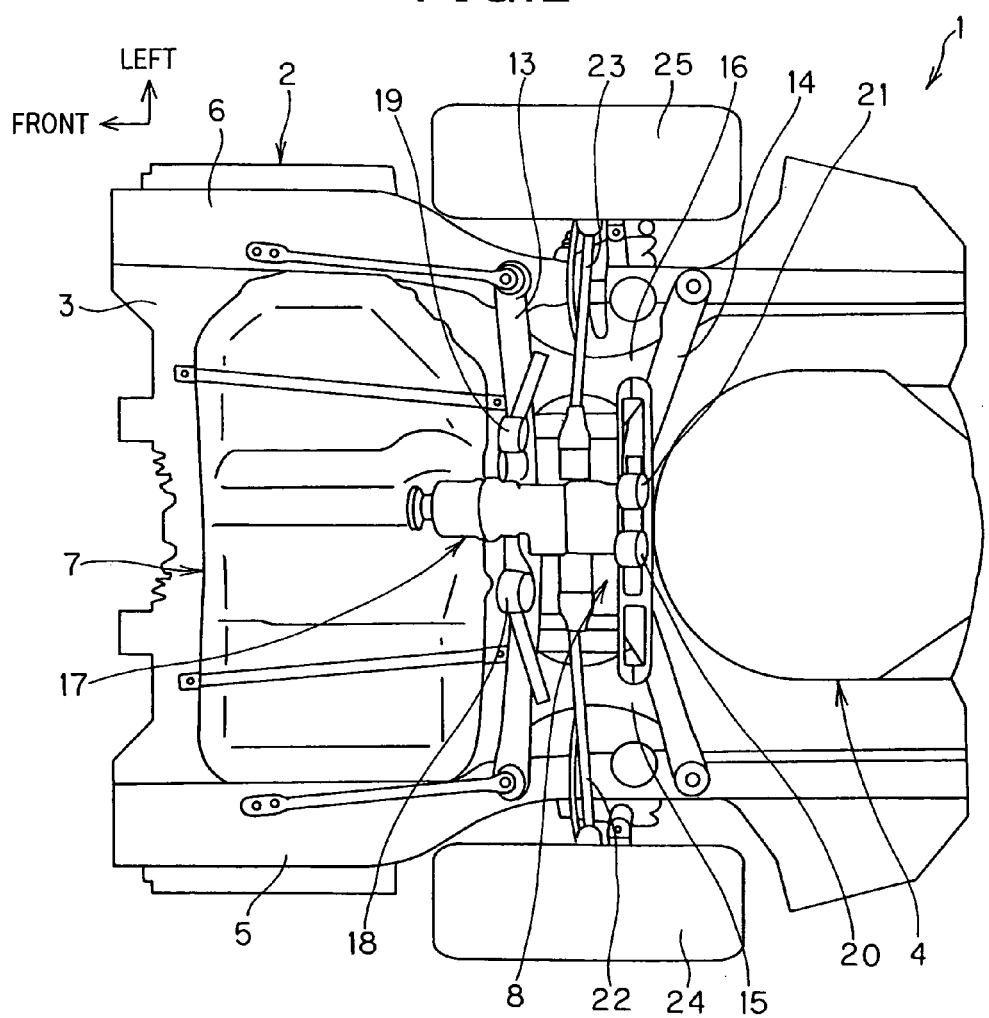
FIG. 2 is a bottom view of the rear floor of the vehicle showing an embodiment of the canister mounting structure.

In FIGS. 1 and 2, a vehicle 1 includes a vehicle body 2, a rear floor 3, a spare tire house 4, a right side member 5, and a left side member 6. The vehicle 1 forms the spare tire house 4 at a central portion of the rear floor 3 constituting the vehicle body 2 in the widthwise direction of the vehicle. The spare tire house 4 projects downward of the vehicle. On the lower side of the rear floor 3, a pair of right side member 5 and left side member 6 extending in the longitudinal direction of the vehicle are disposed on both sides of the spare tire house 4 in the widthwise direction of the vehicle. A fuel tank 7 in which fuel of an engine is stored and the spare tire house 4 are disposed between the left and right side members 5 and 6 in this order from the front of the vehicle.

Figure 3:
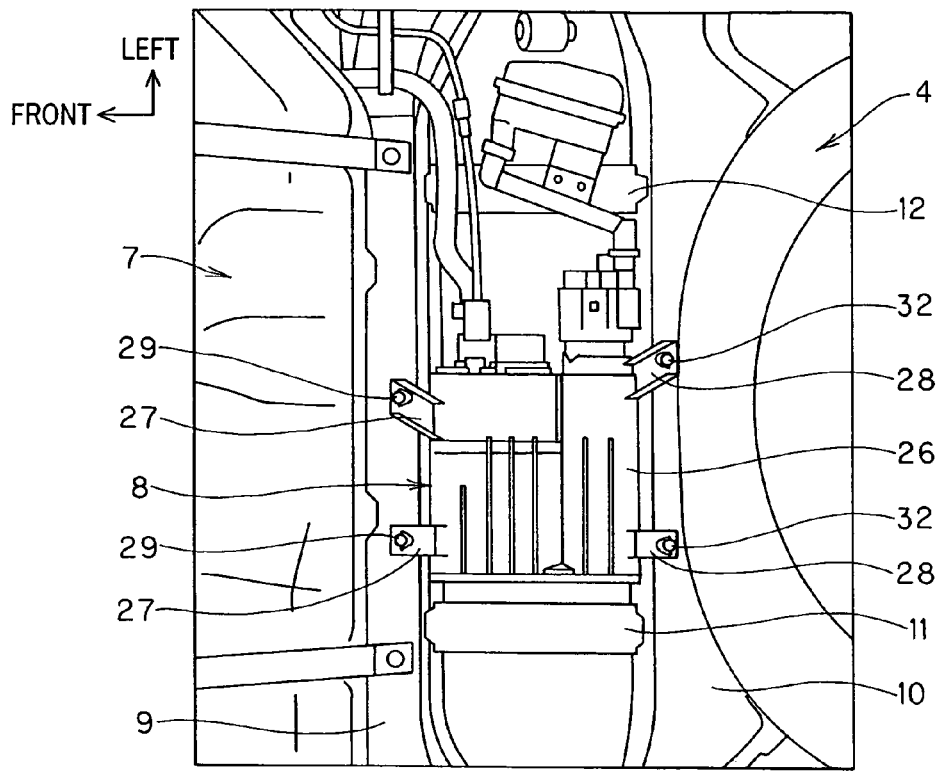
FIG. 3 is a bottom view of a canister mounted on cross members showing an embodiment of the canister mounting structure.

A canister 8 which introduces and adsorbs evaporated fuel generated in the fuel tank 7 is disposed between the fuel tank 7 and the spare tire house 4. In the mounting structure of the canister 8, as shown in FIGS. 1 and 3, a pair of front cross member 9 and rear cross member 10 extending in the widthwise direction of the vehicle are connected to the left and right side members 5 and 6 between the fuel tank 7 and the spare tire house 4. The canister 8 is disposed directly below the rear floor 3 between the front and rear cross members 9 and 10, and is mounted on the front and rear cross members 9 and 10.

With this, when an impact force is applied to the mounting structure of the canister 8 from behind the vehicle, the canister 8 can be protected by the front and rear cross members 9 and 10 having high rigidity. Therefore, it is possible to prevent the canister 8 from being damaged. According to the mounting structure of the canister 8, since the canister 8 can be disposed at a high location directly below the rear floor 3, the protection member which protects the canister 8 from a stone or a projection of the ground becomes unnecessary, and the weight and cost of the structure can be reduced.

As shown in FIG. 3, a pair of right side reinforcement 11 and left side reinforcement 12 extend in the longitudinal direction of the vehicle on both sides of the canister 8 in the widthwise direction of the vehicle. The pair of right and left side reinforcements 11 and 12 are connected to the front and rear cross members 9 and 10.

With this arrangement, according to the mounting structure of the canister 8, when an impact force is applied from behind the vehicle, the right and left side reinforcements 11 and 12 can support the impact force, and can prevent the front and rear cross members 9 and 10 from being deformed, thereby preventing the canister 8 from being damaged.

As shown in FIGS. 1 and 2, a pair of front sub-frame 13 and a rear sub-frame 14 extending in the widthwise direction of the vehicle are mounted on the right and left side members 5 and 6 below the front and rear cross members 9 and 10. A pair of right sub-frame side member 15 and a left sub-frame side member 16 extending in the longitudinal direction of the vehicle on both sides in the widthwise direction of the vehicle are connected to the front and rear sub-frames 13 and 14. A rear differential 17 is disposed between the right and left sub-frame side members 15 and 16. The rear differential 17 is supported through a pair of right and left front differential mounts 18 and 19, and a pair of right and left rear differential mounts 20 and 21. Right and left rear wheels 24 and 25 are connected to the rear differential 17 through right and left axles 22 and 23.

According to the mounting structure of the canister 8, the canister 8 is disposed directly below the rear floor 3 between the front and rear cross members 9 and 10, and directly above the rear differential 17 supported by the front and rear sub-frames 13 and 14, and the canister 8 is mounted on the front and rear cross members 9 and 10.

With this arrangement, according to the mounting structure of the canister 8, since a lower side of the canister 8 is covered with the rear differential 17, it is possible to protect the canister 8 from stones and projections from the ground.

Figure 4:
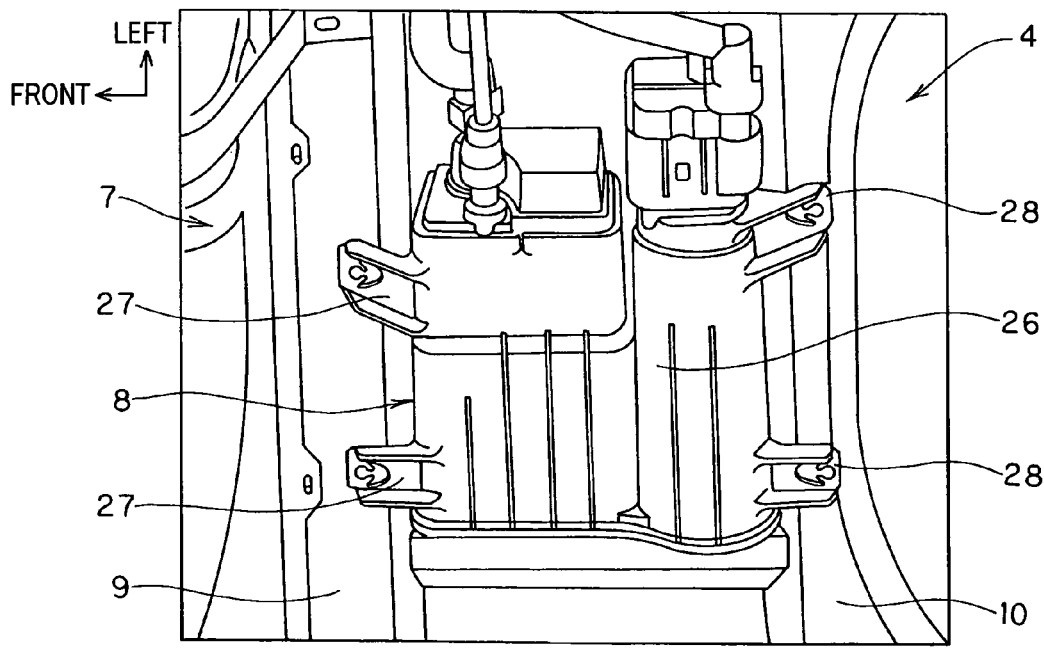
FIG. 4 is a perspective view of the canister mounted on the cross members as viewed from a left and lower direction showing an embodiment of the canister mounting structure.
Figure 5:
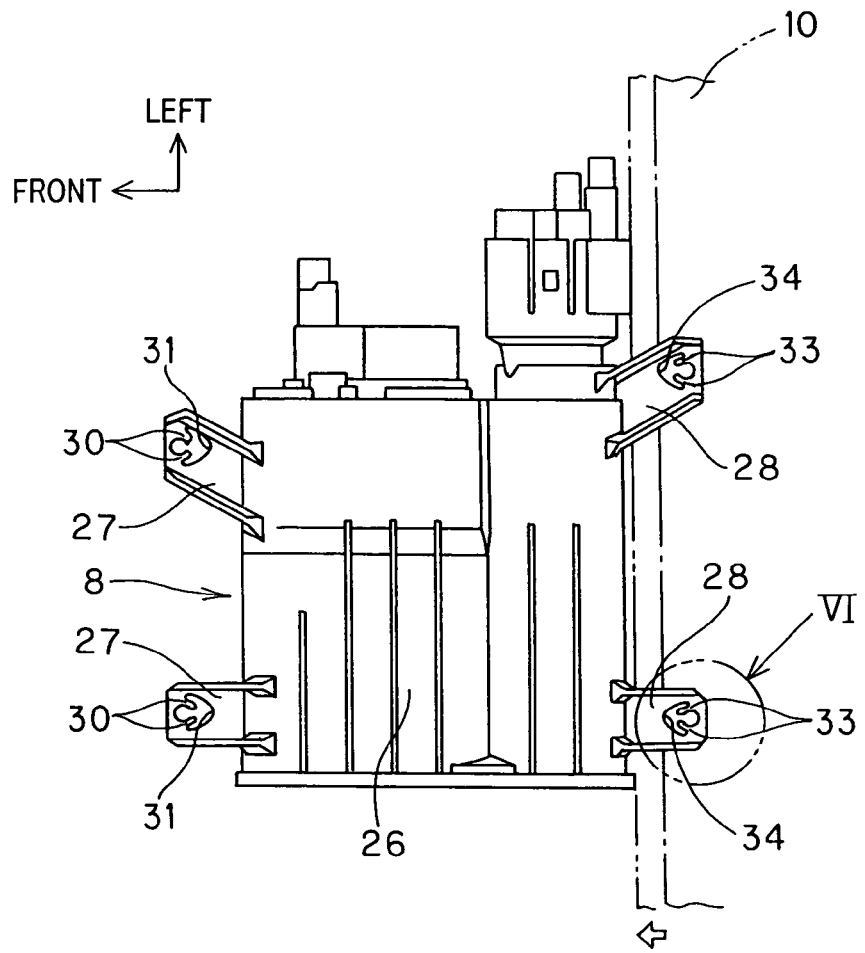
FIG. 5 is a bottom view of the canister showing an embodiment of the canister mounting structure.

As shown in FIGS. 3 to 5, a canister body 26 of the canister 8 is provided with a pair of front mounting members 27 and a pair of rear mounting members 28 which project forward and backward of the vehicle.

As shown in FIG. 5, the front mounting members 27 respectively include front engaging portions 30 fixed to a lower surface of the front cross member 9 by means of front fixing tools 29, such as bolts. The front engaging portions 30 are formed into a pair of opposed angle shapes capable of deforming such as to separate from the front fixing tools 29 when the canister 8 moves forward of the vehicle. The front mounting members 27 respectively include front accommodating portions 31 in which the front fixing tools 29 separated from the front engaging portions 30 are accommodated.

The pair of rear mounting members 28 respectively include rear engaging portions 33 fixed to a lower surface of the rear cross member 10 through rear fixing tools 32 such as bolts. The rear engaging portions 33 are formed into a pair of opposed angle shapes capable of deforming so that the rear fixing tools 32 separate when the rear cross member 10 moves forward of the vehicle. The rear mounting members 28 respectively include rear accommodating portions 34 which accommodate the rear fixing tools 32 separated from the rear engaging portions 33.

According to the mounting structure of the canister 8, as shown in FIG. 3, the front engaging portions 30 of the front mounting members 27 of the canister body 26 are fixed to the front cross member 9 through the front fixing tools 29, and the rear engaging portions 33 of the rear mounting members 28 of the canister body 26 are fixed to the rear cross member 10 through the rear fixing tools 32, thereby mounting the canister 8 on the front and rear cross members 9 and 10.

Figure 6:
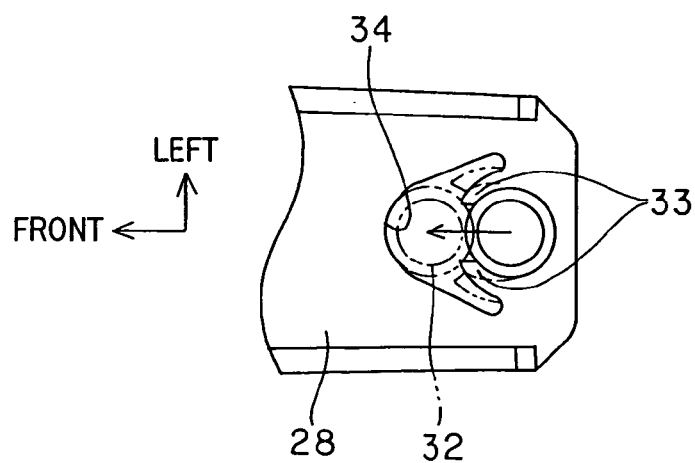
FIG. 6 is an enlarged bottom view of a rear mounting member indicated with the arrow VI in FIG. 5 showing the embodiment of the canister mounting structure.

According to the mounting structure of the canister 8, when an excessive impact force is applied from behind the vehicle and the rear cross member 10 is deformed and is moved from a position shown with a dotted line to a vehicle front position shown with a phantom line in FIG. 5, the rear engaging portions 33 of the rear mounting members 28 are deformed by the rear fixing tools 32 which move in an arrow direction, so as to spread into a shape as shown with the phantom line in FIG. 6, and the rear fixing tools 32 are finally separated and accommodated in the rear accommodating portions 34 as shown with the phantom line.

According to the mounting structure of the canister 8, the rear fixing tools 32 are separated from the rear engaging portions 33 of the rear mounting members 28 to release the impact force, and the canister 8 can be prevented from being damaged.

According to the mounting structure of the canister 8, when the canister 8 is moved forward of the vehicle by an impact force from behind the vehicle, the front engaging portions 30 are deformed such as to spread by the movement of the front mounting members 27 with respect to the front fixing tools 29, the front engaging portions 30 are finally separated from the front fixing tools 29 and the front fixing tools 29 are accommodated in the front accommodating portions 31.

With this, according to the mounting structure of the canister 8, the front engaging portions 30 of the front mounting members 27 are separated from the front fixing tools 29, the impact force is released, and it is possible to prevent the canister 8 from being damaged.

According to the mounting structure of the canister 8, even if the front engaging portions 30 and the rear engaging portions 33 are separated from the front fixing tools 29 and the rear fixing tools 32, respectively, the canister 8 can be supported by the front sub-frame 13 and rear sub-frame 14 disposed on the lower side, and it is possible to prevent the canister 8 from falling. FIG. 2 shows an embodiment wherein the front sub-frame 13 and rear sub-frame 14 appear moveable or pivotable.

According to the mounting structure of the canister of the present invention, the canister is disposed and mounted directly below the rear floor between the pair of front and rear cross members, thereby protecting the canister from an impact force, and the protection member becomes unnecessary. This mounting structure can be applied to a vehicle in which a fuel tank and a spare tire house are disposed in a lower portion of the rear floor.

I claim:

1. A canister mounting structure for a vehicle having a rear floor with a central portion in which a spare tire house projecting downward is formed in a widthwise direction, a pair of left and right side members extending in a longitudinal front to rear direction of the vehicle disposed on a lower side of the rear floor, a fuel tank disposed between the side members on the lower side of the rear floor, a front cross member extending in the widthwise direction of the vehicle disposed adjacent the fuel tank and connected to the side members, a rear cross member extending in the widthwise direction of the vehicle disposed adjacent the spare tire house and connected to the side members, and a canister disposed directly below the rear floor and adjacent to and between the front and rear cross members, the canister for introducing and adsorbing evaporated fuel generated in the fuel tank, the canister including:

a canister body provided with front mounting members projecting forwardly therefrom in the longitudinal front to rear direction of the vehicle for securement to the front cross member, the front mounting members comprising front engaging portions that are secured to the front cross member by fixing tools, the canister body being provided with rear mounting members projecting rearwardly therefrom in the longitudinal front to rear direction of the vehicle for securement to the rear cross member, the rear mounting members comprising deformable rear engaging portions that are secured to the rear cross member by fixing tools and rear accommodating members that are disposed adjacent and forwardly of the rear engaging portions in the longitudinal front to rear direction of the vehicle, wherein an impact force applied to the rear of the vehicle moves the rear cross member forward toward the canister body relative to the vehicle, causing the rear engaging portions to deform so that the rear fixing tools move with the rear cross member and the rear fixing tools advance into the rear accommodating portions, whereby the canister body remains secured to the rear cross member, each rear mounting member comprises a rear engaging aperture and each rear accommodating portion comprises a rear accommodating aperture, the rear engaging portions of each of the rear mounting members being disposed between the respective rear engaging aperture and the rear accommodating aperture in the longitudinal front to rear direction of the vehicle, and each rear engaging aperture and the respective rear accommodating aperture are arranged in a linear orientation with one another generally parallel to the longitudinal front to rear direction of the vehicle.

2. The canister mounting structure according to claim 1, the front mounting members further comprising front accommodating portions disposed rearwardly of the respective front engaging portions in the longitudinal front to rear direction of the vehicle, wherein the impact force applied to the rear of the vehicle moves the canister body forward toward the front cross member relative to the vehicle, causing the front engaging portions of the front mounting members to deform between the canister body and the front cross member so that the canister body and the front mounting members move toward the front cross member and the fixing tools move into the front accommodating portions of the front mounting members.

3. The canister mounting structure according to claim 1, including a pair of left and right side reinforcements extending in the longitudinal front to rear direction of the vehicle and connected to the front and the rear cross members, the left and right side reinforcements being disposed on opposing sides of the canister.

4. The canister mounting structure according to claim 1, including a pair of front and rear sub-frames extending in the widthwise direction of the vehicle and mounted on the pair of left and right side members below the pair of front and rear cross members, wherein the canister is disposed directly above a rear differential supported by the sub-frames.

5. The canister mounting structure according to claim 1, wherein each said rear engaging aperture opens into and communicates with the respective said rear accommodating aperture.

6. The canister mounting structure according to claim 5, including a pair of left and right side reinforcements extending in the longitudinal front to rear direction of the vehicle and connected to the front and the rear cross members, the left and right side reinforcements being disposed on opposing sides of the canister.

7. The canister mounting structure according to claim 6, including a pair of front and rear sub-frames extending in the widthwise direction of the vehicle and mounted on the pair of left and right side members below the pair of front and rear cross members, wherein the canister is disposed directly above a rear differential supported by the sub-frames.

8. The canister mounting structure according to claim 1, wherein the fixing tools comprise bolts.

9. The canister mounting structure according to claim 1, wherein the front cross member is a separate component from the rear cross member and is spaced from the rear cross member in the longitudinal front to rear direction of the vehicle.

10. A canister mounting structure in which a spare tire house projecting downward of a vehicle is formed in a central portion of a rear floor of the vehicle in a widthwise direction of the vehicle, a pair of left and right side members extending in a longitudinal front to rear direction of the vehicle are disposed on a lower side of the rear floor, a fuel tank and the spare tire house are disposed between the side members in order from a front of the vehicle, and a canister for introducing and adsorbing evaporated fuel generated in the fuel tank is disposed between the fuel tank and the spare tire house, wherein a pair of front and rear cross members extending in the widthwise direction of the vehicle are connected to the side members between the fuel tank and the spare tire house, the canister is disposed directly below the rear floor between the pair of front and rear cross members, and the canister comprises a canister body, the canister body is provided with front mounting members and rear mounting members respectively projecting forward and rearward with respect to the longitudinal front to rear direction of the vehicle, the front mounting members include front engaging portions which are fixed to the front cross member by front fixing tools, the rear mounting members include rear engaging portions which are fixed to the rear cross member by rear fixing tools and rear accommodating portions disposed forwardly of the rear engaging portions in the longitudinal front to rear direction of the vehicle, the rear accommodating portions accommodating the rear fixing tools when the rear fixing tools are separated from the rear engaging portions, the rear mounting members each include first and second apertures in communication with one another, the first aperture being located rearwardly of the second aperture in the longitudinal front to rear direction of the vehicle and being arranged in a linear orientation with the second aperture generally parallel to the longitudinal front to rear direction of the vehicle, the rear engaging portions being disposed between the respective said first and second apertures in the longitudinal front to rear direction of the vehicle, the rear fixing tool is located in the respective said first aperture before the impact force is applied from behind the vehicle, when an impact force is applied from behind the vehicle and the rear cross member is moved forward relative to the vehicle body, the rear engaging portions deform so that the rear fixing tools are separated from the rear engaging portions and move forward into the rear accommodating portions disposed forwardly of the rear engaging portions and when the impact force is applied from behind the vehicle, the rear engaging portions deform to permit the rear fixing tool to move forwardly and out of the first aperture and into the second aperture.

11. The canister mounting structure according to claim 10, wherein the front mounting members include front accommodating portions disposed rearwardly of the respective front engaging portions in the longitudinal front to rear direction of the vehicle, the front accommodating portions accommodating the front fixing tools when the front fixing tools are separated from the front engaging portions, when the canister moves forward of the vehicle by an impact force from behind the vehicle, the front engaging portions deform so as to separate from the front fixing tools and the front fixing tools move rearwardly into the front accommodating portions disposed rearwardly of the front engaging portions.

12. The canister mounting structure according to claim 10, wherein a pair of left and right side reinforcements extending in the longitudinal front to rear direction of the vehicle are connected to the pair of front and rear cross members on both sides of the canister.

13. The canister mounting structure according to claim 10, wherein a pair of front and rear sub-frames extending in the widthwise direction of the vehicle are mounted on the pair of left and right side members below the pair of front and rear cross members, wherein the canister is disposed directly below the rear floor between the pair of front and rear cross members and directly above a rear differential supported by the sub-frames, and the canister is mounted on the pair of front and rear cross members.

14. The canister mounting structure according to claim 10, wherein the front cross member is a separate component from the rear cross member and is spaced from the rear cross member in the longitudinal front to rear direction of the vehicle.

15. A canister mounting structure for a vehicle having a rear floor with a central portion in which a spare tire house projecting downward is formed in a widthwise direction, a pair of left and right side members extending in a longitudinal front to rear direction of the vehicle disposed on a lower side of the rear floor, a fuel tank disposed between the side members on the lower side of the rear floor, a front cross member extending in the widthwise direction of the vehicle disposed adjacent the fuel tank and connected to the side members, a rear cross member extending in the widthwise direction of the vehicle disposed adjacent the spare tire house and connected to the side members, and a canister disposed directly below the rear floor and adjacent to and between the front and rear cross members, the canister for introducing and adsorbing evaporated fuel generated in the fuel tank, the canister including:

a canister body provided with front mounting members projecting forwardly therefrom in the longitudinal front to rear direction of the vehicle for securement to the front cross member, the front mounting members comprising front engaging portions that are secured to the front cross member by fixing tools, the canister body being provided with rear mounting members projecting rearwardly therefrom in the longitudinal front to rear direction of the vehicle for securement to the rear cross member, the rear mounting members comprising deformable rear engaging portions that are secured to the rear cross member by fixing tools and rear accommodating members that are disposed adjacent and forwardly of the rear engaging portions in the longitudinal front to rear direction of the vehicle, wherein an impact force applied to the rear of the vehicle moves the rear cross member forward toward the canister body relative to the vehicle, causing the rear engaging portions to deform so that the rear fixing tools move with the rear cross member and the rear fixing tools advance into the rear accommodating portions, whereby the canister body remains secured to the rear cross member, and the rear mounting members each include first and second apertures in communication with one another, the first aperture being located rearwardly of the second aperture in the longitudinal front to rear direction of the vehicle and being arranged in a linear orientation with the second aperture generally parallel to the longitudinal front to rear direction of the vehicle, the rear engaging portions being disposed between the respective said first and second apertures in the longitudinal front to rear direction of the vehicle, the rear fixing tool is located in the respective said first aperture before the impact force is applied to the rear of the vehicle, and when the impact force is applied to the rear of the vehicle, the rear engaging portions deform to permit the rear fixing tool to move forwardly and out of the first aperture and into the second aperture.

* * * * *